United States Patent [19]

Bollman

[11] Patent Number: 4,705,327
[45] Date of Patent: Nov. 10, 1987

[54] MULTI-ADJUSTABLE, MULTI-FUNCTIONAL WORK STATION SYSTEM

[76] Inventor: Clifford J. Bollman, 715 NE. 138th Ave., Vancouver, Wash. 98664

[21] Appl. No.: 844,135

[22] Filed: Mar. 26, 1986

Related U.S. Application Data

[63] Continuation-in-part of Ser. No. 654,952, Sep. 27, 1984, abandoned, which is a continuation of Ser. No. 417,543, Sep. 13, 1982, abandoned.

[51] Int. Cl.$^4$ .............................................. A47B 9/00
[52] U.S. Cl. ........................................ 312/312; 108/8; 108/144; 248/242; 248/297.2
[58] Field of Search ............. 312/312, 257 R, 257 SK; 108/1, 8; 248/242, 371, 393, 243, 125, 297.2, 61, 348, 4, 408

[56] References Cited

U.S. PATENT DOCUMENTS 2,329,815  9/1943  Attwood .......................... 312/257 R
3,921,539  11/1975  Berger ..................................... 108/8

FOREIGN PATENT DOCUMENTS

96460  7/1960  Norway .............................. 248/242

Primary Examiner—Joseph Falk
Attorney, Agent, or Firm—Marger & Johnson

[57] ABSTRACT

A multi-adjustable, multi-functional work station system is provided including vertically-extending support means adjustable at a plurality of horizontal and angular positions with respect to the vertical axis of the support means. The accessory means are attached to a connector means which is adjustably coupled to track means located within the support means. The track means are disposed parallel one with respect to the other.

28 Claims, 10 Drawing Figures

MULTI-ADJUSTABLE, MULTI-FUNCTIONAL WORK STATION SYSTEM

REFERENCE TO PRIOR APPLICATION

This is a continuation-in-part of U.S. patent, Ser. No. 654,952, filed Sep. 27, 1984, now abandoned, which is a continuation of U.S. patent application, Ser. No. 417,543, filed Sep. 13, 1982.

BACKGROUND OF THE INVENTION

This invention relates to a multi-adjustable, multi-functional work station system.

Vertically adjustable, horizontal surfaces, which are vertically supported, are known in the prior art. These horizontal surfaces are undirectionally adjustable in fixed vertical plane.

U.S. Pat. No. 2,547,296 to White, for example, relates to a vertically adjustable, horizontal table in which vertical support members, in the form of sheet metal inner and upper panel sections 12 and outer and lower sheet metal panel sections 13, are in guided relationship with each other for supporting a flat table top 10. Table top 10 is vertically adjustable in a fixed, undirectional plane. Similarly, in U.S. Pat. No. 4,026,222 to Meuller, horizontal seat member 28 is vertically adjustable with respect to vertically-extending support posts 11 and 12 by employing handles 42 to engage and disengage pawl 43 and slots 18 to effect said adjustable movement. A vertically adjustable work station is also provided in U.S. Pat. No. 4,272,136 to Senqua. This vertical adjustment is accomplished employing the adjustable support leg assembly described in FIGS. 5-7 of the Senqua patent.

In summary, the above-described prior art vertically-extending members support a horizontal surface, and a horizontal position, in a fixed vertical plane, and are vertically adjustable only in a horizontal plane. Furthermore, all of the above vertical supports are unifunctional and are designed for single-purpose use. Therefore, systems which these members support are severely limited and exhibit little or no flexibility of use while causing a maximum amount of obstruction to the user.

DETAILED DESCRIPTION OF THE DRAWINGS

SUMMARY OF THE INVENTION

Contrary to prior art, adjustable tables, adjustable seats, and work stations, and the like, as previously described, which are directed only to vertically adjustable and horizontally supported unifunctional systems, the work station systems of this invention are multi-adjustable and multifunctional in nature.

The systems of the present invention include novel, vertically-extending support means, which are capable of supporting a plurality of accessory means, such as rectangular work surfaces and the like. The accessory means can be adjusted to a plurality of horizontal and angular positions with respect to the vertical axis of the support means.

The vertically-extending support means of the present invention includes a plurality of vertically-extending track means disposed generally parallel one with respect to the other and forming a channel means therewithin. The track means are spaced apart at a distance which will facilitate bracing of an accessory means in the fixed position with respect to the support means. The track means are also spaced apart at a distance for facilitating the structural integrity of the support means. Preferably, the support means comprises a pair of vertically-extending stanchions, including vertically-extending track means, preferably comprising channel means, spaced apart by, and attached to, a central post means, the post means acting to provide improved structural integrity therefor. The vertically-extending support means described above preferably has a rectangular, cross-sectional configuration.

The accessory means are attached to a connector means. The connector means is adjustably coupled to the support means for movement within the track means. By moving the connector means within each of the track means, the work surface can be adjusted in an upward and downward direction, to a plurality of horizontal and angular positions with respect to the vertical axis of said support means. Furthermore, the work surfaces are preferably adjustable in a forward and backward direction to a plurality of horizontal positions with respect to the vertical axis of the support means. This is preferably accomplished by movement of the connector means within a peripheral track located in the accessory means. The respective tracks in each member are facing in the same direction. By moving the connector means in an upward and downward direction within each track means, the accessory means will be maintained at various horizontal and/or angular positions with respect to said support means.

The connector means preferably is independently movable within each of a pair of track means in the support means, and preferably comprises respective bracket and support plates joined one to the other, preferably at right angles. In position, the bracket plate rests against the face of the support means, and the support plate extends outwardly therefrom, for purposes of supporting the accessory means in a desired predetermined position. Apertures located within the plate facilitate movable attachment of the connector means to the support means, while aperture in the support plate facilitates attachment of the accessory means to the connector means.

Preferably, attachment means, which are typically bolts or the like, joins the connector means to a retaining means movably located within each of the tracks. The retainer means preferably comprises a bar sized to move within the track for varying the horizontal and vertical positions of the work surface. The retaining means includes a pair of parallel, spaced-apart groove means which are in sliding engagement with the vertically-extending stanchions for minimizing turning of the retaining means within the track means. A bolt or the like is preferably employed as the attachment means. Therefore, the retaining means preferably includes a threaded opening for receiving detachment means therewithin.

Various accessory means can be included in the subject system. The preferred accessory means is, of course, the rectangular work surface. For example, other accessory means includes an overhead lighting fixture. This overhead fixture is preferably disposed within the confines of the central reinforcing post and is in slideable engagement in an upward and downward direction therewithin. Other accessories, for example, include footrest means, side table means, shelf means and the like.

In a preferred embodiment of this invention, accessory means in the form of a rectangular work surface are attached at one or both ends to the support means to form a work table, footrest, or shelf, respectively. Furthermore, at least one accessory means is preferably attached to both sides of the multi-functional support means. A plurality of support means may be disposed in the side-by-side configuration, wherein a pair of work tables may be supported on the opposite sides of a single support means. Therefore, by employing the subject work station system, unlimited arrangements of modular, interchangeable systems can be provided in which work positioning can be established on an individual basis, resulting in the maximization of personal comfort and organization for the ultimate user.

DETAILED DESCRIPTION OF THE INVENTION

Figures 1, 2, 3, 6:
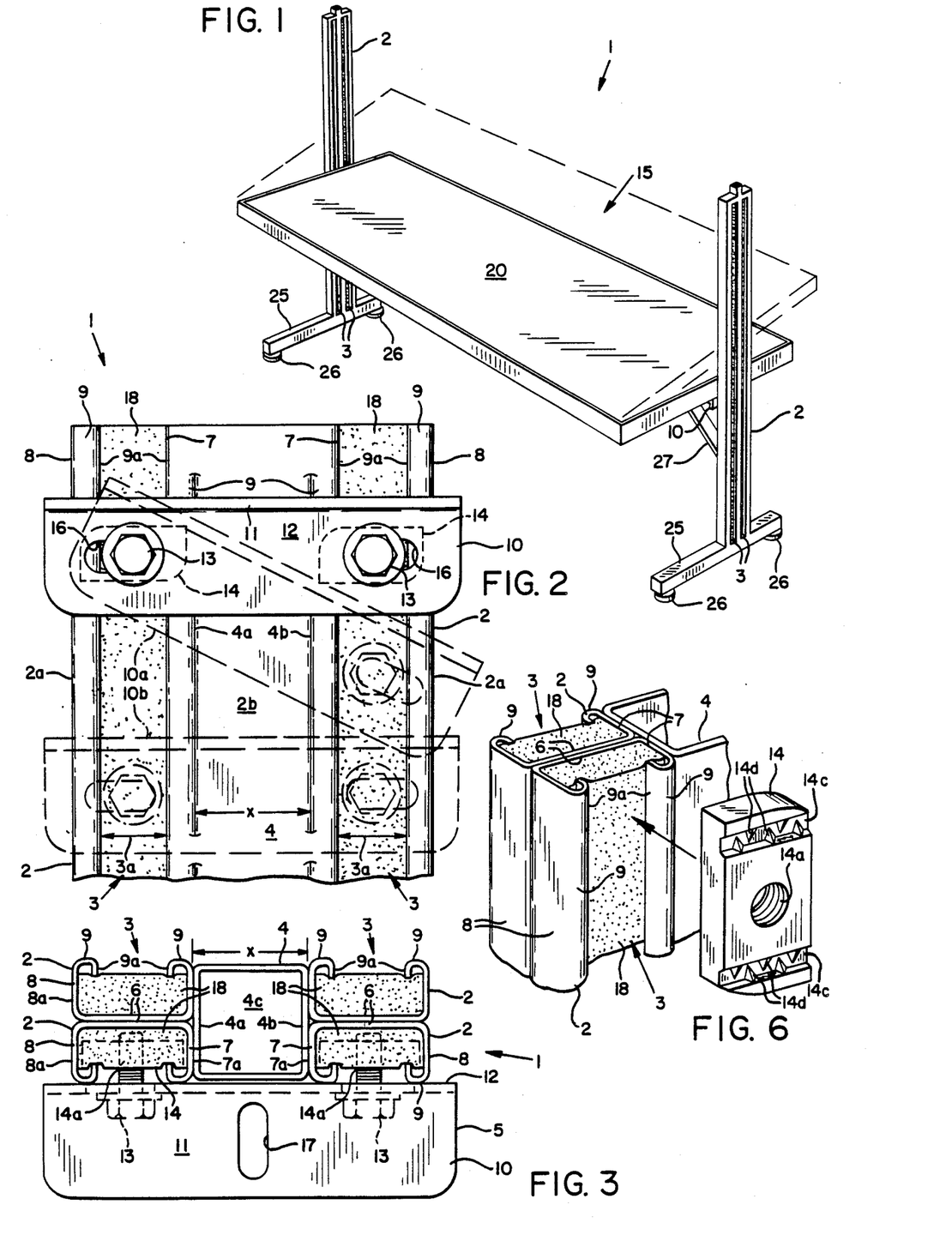
FIG. 1 is a perspective view of a work station system including a pair of support means having an accessory, in the form of a work surface connected at both ends to each of the support means, the work surface being disposed in respect of horizontal and angular positions.
FIG. 2 is an enlarged, sectional view of the support means 2 of the present invention.
FIG. 3 is a plan view of the support means depicted in FIG. 2.
FIG. 6 is an enlarged, perspective view specifying in detail retaining means 14 and its operational relationship to support means 2.

Referring now to FIG. 1, a multi-adjustable, multi-functional work station system 1 is provided, which includes a novel, vertically-extending support means 2, having vertically-extending track means 3 located therein, for maintaining at least one accessory means 15 in a plurality of horizontal and angular positions with respect to the vertical axis of support means 2. A work surface 20 is depicted in a horizontal and angular position (in phantom), respectively in FIG. 1.

Support means 2 are maintained in a vertical position by a support base 25 which is made more stable by support feet 26 located at the respective ends of the support base 25. To promote retaining of the work surface 20 in a fixed position, a support arm 27 is provided which is joined at one end to the underside of the work surface 20 and at the other end within track means 3 of support means 2.

The support means 2, which includes a plurality of vertically-extending track means 3, are disposed generally parallel one with respect to the other, and preferably form a channel means 3a therewithin. The track means 3 is spaced apart at a distance for facilitating the structural integrity of the support system, for example, at a distance "X" in FIGS. 2 and 3. It also provides for the effective bracing of various accessory means connected to said support means 2.

Support means 2, as depicted in FIGS. 2 and 3, preferably comprises a multi-component structure in which a plurality of vertically-extending support stanchions 2a are joined to the opposite sides 4a and 4b, respectively, of an intermediate, vertically-extending reinforcing post 4. The intermediate, vertically-extending reinforcing post 4 preferably includes a hollow central core section preferably having a generally rectangular cross-sectional configuration.

Each of the support stanchions 2a preferably have a track means 3 disposed therewithin. The support stanchion 2a preferably has a generally U-shaped, cross-sectional configuration. Support stanchion 2a comprises a base section 6, which is rearwardly-facing, joined to side sections 7 and 8, which are respectively inwardly-facing and outwardly-facing. Typical side sections 7 and 8 are disposed generally parallel one with respect to the other and are generally perpendicular to base section 6.

In order to more effectively retain hereinafter described connector means 10 within track means 3, vertically-extending flange means 9, attached to the outer ends 7a and 8a of side sections 7 and 8, are provided. Support means 2 in a multi-component form comprises post 4 joined at its opposite ends 4a and 4b to the inwardly-facing sections 7 of a pair of stanchions 2a. In the most preferred form, the support means comprise a pair of the multi-component structures previously described in which the respective rearwardly-facing base sections 6 are attached back-to-back to provide the system readily depicted in FIG. 3.

In this latter configuration, a pair of track means 3 are disposed within and on opposite sides of said support means to form a dual-sided configuration 1a. By employing this dual-sided structure, accessory means can be disposed on both sides of the support means or, alternatively, a plurality of side-by-side work station systems can be fabricated. In this way, a plurality of work station systems are capable of being designed to suit the desires of the ultimate purchaser.

Figures 4, 5:
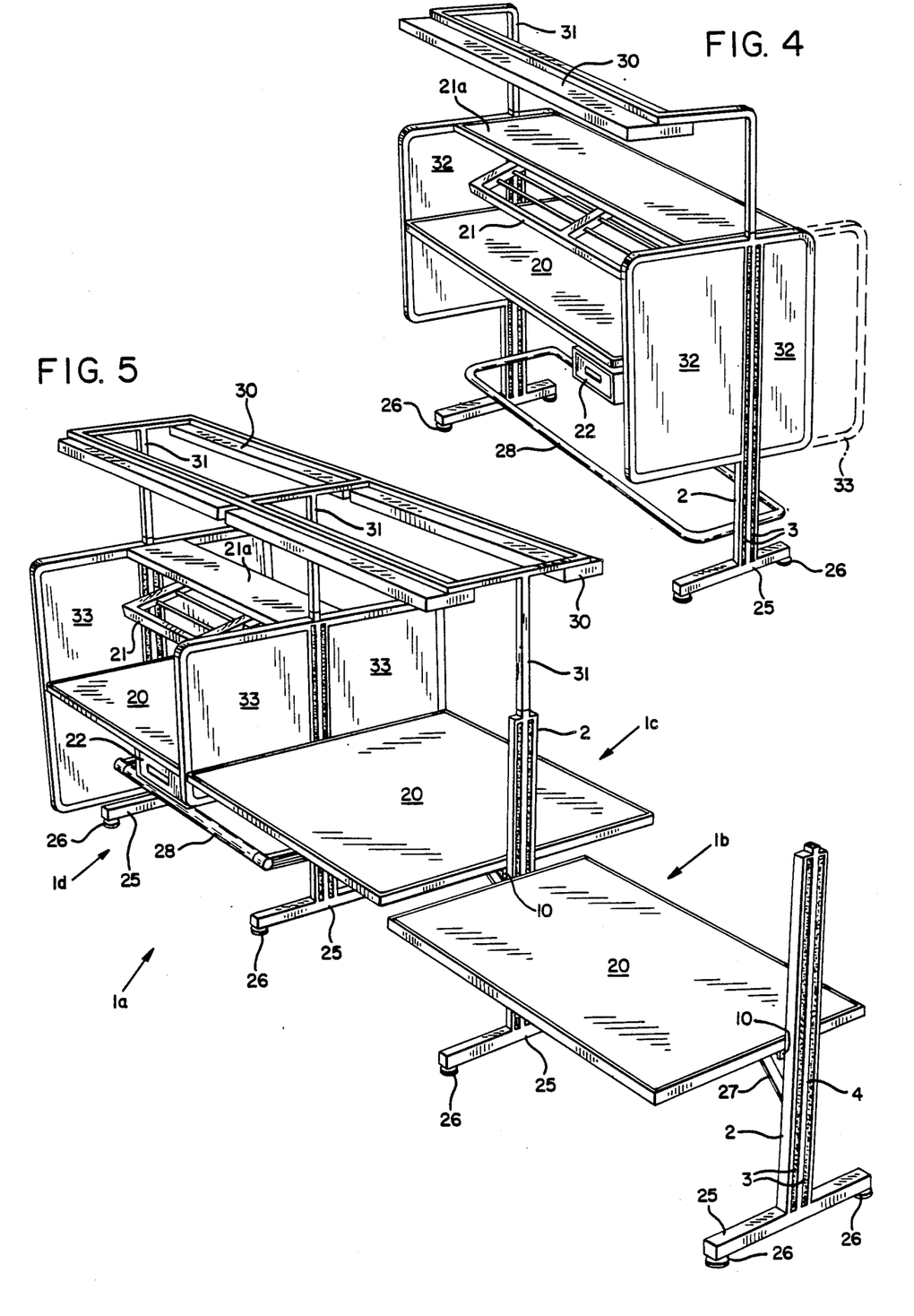
FIG. 4 is a perspective view of the work station of FIG. 1 further including various accessory means.
FIG. 5 is a perspective view of the work station system of FIG. 4 further including additional work stations disposed in a side-by-side relationship.

Referring to FIG. 5, a side-by-side work station system 1a is provided, wherein three work stations 1b-1d are depicted. Work station 1b is a one-sided work table. Work station 1c is a two-sided work table including partitions 33, overhead light means 30, shelves 21 and 21a, drawer 22, and footrest 28.

In a preferred form of this invention, support means 2 comprises a single, unitary structure, including a plurality of track means 3 as previously described above.

Accessory means 15 are attached to a at least one support means 2 employing connector means 10. In one preferred embodiment of this invention (See FIG. 4), a work surface 20, i.e., table means, are attached at both ends to a pair of support means 2. Another work surface attached at both ends to a support means 2, such as shelf 21, and adjustable wire shelf 21a, are supported at their outer ends. The accessory means can include, in addition to tables and shelves supported at one or both ends, other accessories such as footrest means 28, and the like.

Additional accessory means 15 may also be supported by the work surfaces themselves, not by support means 2. For example, drawer means 22 may be supported from the underside of work surface 20. Preferably, peripheral track means 35 are provided on the underside of the work surface to support these accessory means.

Overhead accessory means 30, such as lamp means and the like, are also provided in the work station system of FIG. 4. The overhead accessory means are supported by engagement of the accessory arms 31, which are in fitting engagement within the inner core 4a of post 4, and are movable in upward and downward direction therein.

Partition means 32 are joined to either side of support means 2 to provide an enclosed work station system. If a two-sided work surface is employed, a wider partition 33 is provided on the back side of support means 2 (see phantom).

Accessory means 15 are movably attached within track means 3 by connector means 10. Connector means 10 are adjustably coupled to the support means 2 for movement in an upward and downward direction to a plurality of positions within track means 3. Moreover, as depicted in FIGS. 2 and 3, connector means 10 is adjustably coupled within each of a pair of track means 3. Connector means 10 traverses, and is disposed in a position substantially parallel to, the face of said support means 2.

Connector means 10 preferably comprise bracket plate means 11 joined to support plate means 12, with bracket plate means 11 resting against the face of support means 2 and the support plate means 12 extending outwardly therefrom. Thus, bracket plate means 11 of FIGS. 2 and 3 traverses and is disposed in a position substantially parallel to the face of support means 2. Preferably, support plate means 12 is disposed generally at right angles to connector plate means 11 so that when support plate means 12 rests against support means 2, bracket plate means 11 extends outwardly from said support means 2. In this manner, connector means 10 provide support for accessory means attached thereto.

Connector means 10 is disposed for upward and downward movement with respect to support means 2 by attachment means 13 which ride within track means 3. As depicted in FIGS. 2 and 3, a pair of attachment means 13 ride within a pair of track means 3 such that one of the pair of attachment means 13 rides within one of the pair of track means 3 and the other attachment means 13 rides within the other track means 3. Moreover, FIGS. 2 and 3 illustrate that each end of connector means 10 is individually attached with each of a pair of individual track means 3. The ends of the connector means are disposed in a parallel side-by-side relationship with respect to said pair of parallel track means via said pair of attachment means 13. Each attachment means rides within one of the respective pair of individual track means 3. Retention of attachment means 13 within track means 3 is facilitated by flange means 9, including flange ends 9a, which maintains same in place therewithin. Attachment means 13 preferably comprise bolts, or preferably threaded bolts and the like, and retaining bar means 14 which fit securely and move within track means 3 in an essentially upward and downward direction.

In a preferred form of this invention, retaining bar means 14 are disposed within track means 3 and the ends of said bar means 14 are held in position by flange means 9. The threaded opening 14a centrally located in the bar means 14 receive attachment means 13 which is also preferably threaded to be received by said bar means 14 and hold said connector means in place, which is also preferably threaded to be received by said bar means 14 and hold said connector means 10 in place.

To maintain aligned movement of connector means 10 within track means 3 in a fixed, downward, vertical plane, retaining bar means 14 preferably includes a pair of groove means 14c disposed parallel one with respect to the other (see FIG. 6). The distance between the respective groove means 14c is preferably equal to the distance between respective flanges 9 so that groove means 14c ride on flange ends 9a. Therefore, the flange ends 9a provide a rail on which groove means 14c will follow. Locking rib means 14d are preferably provided within groove means 14c to facilitate the above described aligned movement. Furthermore, notches 14b are preferably located at the opposite corners of said retaining bar means 14 so that the bar means can be more readily inserted and removed from within track means 3.

Slot means 16, located in support plate means 12, are provided through which attachment means 13 pass for joining same to retaining bar means 14. Additionally, slot means 17 are disposed in the bracket plate means for joining the accessory means 15 to the connector means 10.

To further facilitate maintaining retaining bar means in position within track means 3, a flexible backing material 18 is provided therewithin. The backing material 18 is preferably a flexible, sponge-like composition such as a flexible polyurethane foam, or the like.

In use, the accessory means are moved to various horizontal and angular positions by first loosening the attachment means 13 and then moving retaining means and, in turn, connector means 10, to the requisite horizontal or angular position within track means 3. In FIG. 2, connector means 10 is shown in phantom which indicates movement to respective angular (10a) and horizontal (10b) positions. In similar manner, accessory means is moved forward and backward within the peripheral track means located on the other side of accessory means 15.

In a preferred embodiment, connector means 10' comprise a plurality of brake plate means 11'—support plate means 12' assemblies disposed within a plurality of track means 3. Preferably, a pair of the above connector means 10' are disposed for upward and downward movement within a pair of track means, each the connector means 10' being individually movable within an individual track means. This configuration facilitates, for example, angular positioning of the accessory means by independent movement of a single connector means to non-horizontally aligned position one with respect to the other.

In another preferred embodiment, peripheral track means 35 located on the underside of work surface means 20 forms a channel means 35' for supporting accessory means such as shelves, light fixtures, side tables, etc. Channel means 35' is preferably fabricated of strut-like material and forms the outer border of a substantially rectangular work surface 20 in the form of, for instance, table or shelf means.

Work surface means 20 are preferably reinforced at a plurality of intermediate positions. The preferred means of providing such reinforcement by attaching track means disposed parallel one with respect to the other, preferably formed of the previously described strut material, to the underside of the work surface 20. Support arm 27 is preferably coupled to ride within the intermediate track means to provide reinforcement for the work surface while at the same time maintaining same in a fixed, locked position. Connector means 10' are preferably employed to join support arm 27 to respective work surface 20 and support means 2.

Figures 7, 8, 9, 10:
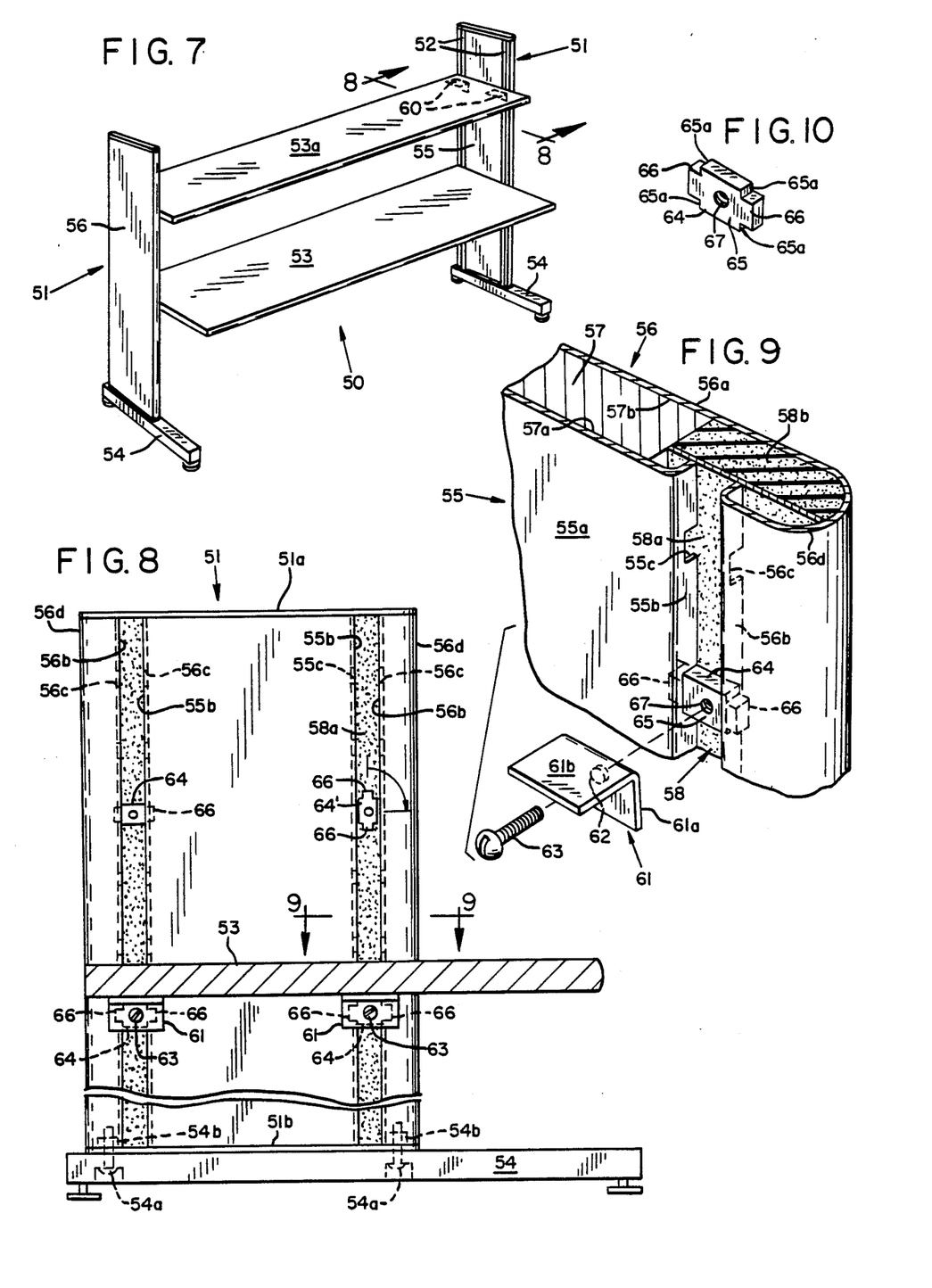
FIG. 7 is a perspective view of a preferred form of the work station system of this invention.
FIG. 8 is an enlarged, sectional view of the system of FIG. 7 taken along line 8—8.
FIG. 9 is an enlarged, fragmentary view of the system of FIG. 8 taken along line 9—9.
FIG. 10 is an enlarged, perspective view of a retaining bar means 64.

Referring now to FIG. 7, a preferred form of the multi-adjustable, multi-functional work station system of this invention, denoted "50", is provided which generally includes vertically-extending support means 51, having located therewithin a plurality of vertically-extending track means 52 disposed generally parallel one to the other, preferably forming a channel means therewithin. At least one accessory means can be supportingly maintained within track means 52 in a plurality of horizontal and angular positions with respect to the vertical axis of support means 51.

Track means 52 are, as previously described, spaced apart at a distance for facilitating the structural integrity of support means 51 while providing effecting bracing of various accessory means connected thereto. In FIG. 7, work surfaces 53 and 53a are supportingly maintained and movably attached within vertically-extending track means 52 by connector means 60 (in phantom). These work surfaces 53 and 53a are similar in configuration and design to previously described work surfaces 20 and 21, respectively.

A support base 54, similar in design to base 25, is employed to maintain support means 51 in a substantially vertical position. Support base 54 is attached to support means 51 by bolt means 54a and nut means 54b.

Support means 51, as more specifically detailed in FIGS. 8-10, comprises inner and outer panel means 55 and 56 which form a single unitary structure by attachment of same to the respective opposite sides 57a and 57b of solid inner core means 57. Core means 57, which is typically fabricated of particularized wood such as particle board or flake board and the like, is adhered to the respective inner surfaces of panel means 55 and 56. The core means 57 is disposed within the central portion of the support means unitary structure.

Panel means 55 comprises a substantially flat plate-like surface 55a having inwardly-directed flange means 55b disposed at each of its respective ends. Panel means 56 also comprises a substantially flat plate-like surface 56a which extends beyond the outer extent of panel means 55. Disposed at the outer ends of panel surface 56a are U-shaped end sections 56d, which form recesses on either side of core means 57, for receiving flexible retention pads 58. Flexible retention pads 58 disposed within said recesses comprise a flexible sponge-like inner portion 58b and an outer protective covering 58a. Preferably, flexible portion 58b comprises a yieldable polymeric foam and the outer covering 58a comprises a synthetic protective fabric material.

U-shaped end sections 56d have inwardly-directed flange means 56b, which are substantially similar in design and construction to flange means 55b, disposed at each of the respective ends. Vertically-extending track means 52 are formed by said pair of inwardly-directed flange means 55b and 56b, which are substantially parallel one with respect to the other.

Flanges 55b and 56b have included therewithin a plurality of vertically-extending, vertically-aligned slots 55c and 56c, respectively, for securingly maintaining accessory means, such as work surfaces 53 and 53a and the like, in a fixed position with respect to said support means 51. Connector means 60 are joined at one end to the underside of work surface 53 and are, at the other end, adjustably coupled to support means 51 for movement in an upward and downward direction to a plurality of positions within aligned slots 55c and 56c. Connector means 60 traverses the face of said support means 51. Connector means 60 comprises bracket means 61 interlockingly connected to a retaining bar means 64. Preferably, connector means 60 includes vertical leg 61a and vertical leg 61b disposed substantially at right angles one with respect to the other. The vertical leg has an aperture 62 located therewithin. Vertical leg 61a preferably rests against the face of support means 51 and the horizontal leg 61b extends horizontal outward therefrom. Vertical leg 61a is disposed in a position substantially parallel to the face of support means 51.

Retaining bar means 64 (see FIG. 10) are disposed for movement in a vertically upward and downward direction within track means 52 and are securingly maintained in a fixed position within slot means 55c and 56c. Bar means 64 preferably comprises a substantially rectangular elongated bar member 65 having shoulder bar members 66 disposed at each of its respective opposite ends. The vertical dimension of bar means 64, in the interlocking position, is smaller than its horizontal dimension. Thus, when bar means 64 spans the extent of track means 52 the elongated dimension thereof is horizontally disposed. The horizontal dimension of bar member 65 is sized to securingly fit between respective flanges 55b and 56b. The vertical dimension of bar member 65 is larger, at the top and/or bottom, than the vertical dimension of the shoulder members 66. The shoulder members 66 are sized to engage aligned slots 55c and 56c and fits therewithin for securingly maintaining bar means 64 in a fixed position. In this way, when shoulder members 66 are engaged within slots 55c and 56c, bar member 65 is larger in the vertical dimension than said slot so that lateral movement is substantially avoided. Furthermore, the engagement of bar means 64 is slots 55c and 56c substantially prohibits vertical movement thereof. Bar member 65 includes a threaded aperture 67 disposed in substantially the center of same. A threaded bolt 63 which passes through aperture 62 securedly engages threaded aperture 67. Thereby, bracket means 61 is interlockingly connected to retaining bar means 64.

Support means 51 also includes a pair of upper and lower protective cap means, designated 51a and 51b, joined to the respective top and bottom ends of panel means 55 and 56. Typically, cap means 51a and 51b are welded to support means 51.

Flange means 55b and 56b impart a substantial degree of structural stiffening for the vertically-extending track means 52, as well as for respective panel means 55 and 56. They also serve to secure hereinafter described retaining bar means 64 by engagement of such flange means 55b and 56b with the end sections 65a of elongated bar member 65.

In use, retaining bar means 64 is inserted within vertically-extended track means 52 resting against flexible retention pad 58 so that the elongated dimension is in a substantially vertical position (see 64' of FIG. 8). The bar means is pushed into the yieldable retention pad causing it to deform. The bar means is then rotated approximately 90 degrees until the elongated dimension is in a substantially horizontal position, and shoulder members 66 are securedly fit within aligned slots 55c and 56c, thereby prohibiting substantial respective vertical and horizontal movement of bar means 64. Bracket means 61 is then interlockingly connected to bar means 64 by engaging bolt means 63 within respective apertures 62 and 67.

I claim:

1. A multi-adjustable, multifunctional work station system, which comprises:
   accessory means for providing a work surface;

at least one vertically-extending support means for supporting said accessory means in a plurality of horizontal and angular positions with respect to the vertical axis of said support means;

a pair of vertically-extending track means located in each support means, disposed generally parallel one with respect to the other, and spaced apart at a distance which will faciliate bracing of said accessory means in a fixed position with respect to said support means, and at a distance for facilitating the structural integrity of said support means;

means defining a channel in each of said track means;

a pair of vertically-extending flange means, attached to said track means for retaining attachment means within the channel means of each said track means, connector means for adjustably coupling said accessory means to each said track means;

a pair of attachment means which ride within the channels of said pair of track means for pivotally coupling the connector means tothe track means, each of said attachment means being independently movable in a generally upward and downward direction within the channels of said pair of track means to a plurality of positions along the vertical axis of said track means;

the connector means including means for coupling each of the attachment means to the connector means;

means for allowing a predetermined amount of independent movement between each connector means and each attachment means within a predetermined range so that the connector means can be positioned in a plurality of angular positions with respect to the vertical axis; and the accessory means being attached to said connector means and thereby being adjustable to a plurality of horizontal and angular positions with respect to the vertical axis of said support means by said movement of each of said attachment means within said pair of track means.

2. The system of claim 1, wherein said accessory means is adjustably coupled to said connector means for movement in a backward and forward direction to a plurality of horizontal positions with respect to the vertical axis of said support means.

3. The system of claim 2, wherein said accesory means comprises a work surface including a peripheral track located on the underside of said work surface, said peripheral track being in the form of channel means.

4. The system of claim 1, wherein a pair of track means is disposed within and on the opposite sides of said support means to form a dual-sided configuration.

5. The system of claim 1, wherein said connector means comprises respective bracket and support plates joined one to the other.

6. The connector means of claim 5, wherein said bracket and support plates are joined at right angles, one to the other.

7. The connector means of claim 5, wherein said bracket plate rests against the face of said support means, and the support plate extends outwardly therefrom for purposes of supporting the accessory means in a desired predetermined position.

8. The system of claim 7, wherein said attachment means are disposed within the bracket plate means for joining said accessory means to said connector means.

9. The system of claim 1 or 5, wherein each end of said connector means is individually attached within each of a pair of individual track means, the ends of said connector means being disposed in a parallel side-by-side relationship with respect to said pair of parallel track means via said attachment means, each attachment means riding within one of the respective pair of individual track means.

10. The system of claim 1 or 5 or 9, wherein said connector means comprises a bracket plate mounted in a position substantially parallel to a face of said support means, the attachment means comprising a pair of bolts, and the bracket plate including slot means defining a pair of openings for receiving each of the bolts, at least one of the openings being elongated and oriented transversely of the vertical axis.

11. The system of claim 5, wherein said connector means includes slot means, located in said support plate means, through which said attachment means passes therethrough for joining said attachment means to said support means.

12. The system of claim 1, wherein said accessory means are attached to said support means at each end.

13. The system of claim 1, wherein said accessory means are attached to said support means at one end.

14. The system of claim 1, wherein connector means traverses, and is disposed in position substantially parallel to the face of said support means.

15. The system of claim 1, wherein said attachment means comprises bolts connected to retaining bar means, said retaining bar means fitting securely and moving within said track means in an upward and downward direction.

16. A mulit-adjustable, multifunctional work station system which comprises:

a work surface;

a pair of vertically-extending support means for supporting said work surface in plurality and angular positions with respect to the vertical axis of said support means;

a pair of vertically-extending track means located in each support means, disposed generally parallel one with respect to the other, facing in the same direction, and spaced apart at a distance which will facilitate bracing of an accessory means in a fixed position with respect to said support means, and at a distance for facilitating the structural integrity of said support means;

means defining a channel in each of said track means;

a pair of vertically-extending flange means, attached to said track means for retaining attachment means within the channel means of each said track means, a pair of connector means for adjustably coupling said work surface to each said track means;

a pair of attachment means which ride within said pair of track means for pivotally coupling the connector means to the track means, each of said attachment means being independently movable in a generally upward and downward direction within the channels of said pair of track means to a plurality of positions along the vertical axis of said track means;

the connector means including means for coupling each of the attachment means to the connector means;

means for allowing a predetermined amount of independant movement between each connector means and each attachment means within a predetermined range so that the connector means can be positioned in a plurality of angular positions with respect to the vertical axis; and the work surface being attached at each end to each of said connector means and thereby being adjustable to a plurality of horizontal and angular positions with respect to the vertical axis of said support means by the movement of each of said pair of attachment means within said pair of track means.

17. The system of claim 16, wherein said accessory means is adjustably coupled to said connector means for movement in a backward and forward direction to a plurality of horizontal positions with respect to the vertical axis of said support means.

18. The system of claim 17, wherein said connector means comprises respective bracket and support plates joined one to the other, wherein said bracket plate rests against the face of said support means, and the support plate extends outwardly therefrom for purposes of supporting the accessory means in a desired predetermined position.

19. The system of claim 16, wherein said connector means comprises respective bracket and support plates joined one to the other wherein said bracket plate rests against the face of said support means, and the support plate extends outwardly therefrom for purposes of supporting the accessory means in a desired predetermined position.

20. The system of claim 16, wherein said work station system includes an overhead aocessory means, including accessory arms, supported by engagement of said accessory arms which are in fitting engagement within the work station system and are movable in upward and downward direction therein.

21. A multi-adjustable, multifunctional work station system, which comprises:

accessory means for providing a work surface;

at least one vertically-extending support means for supporting said accessory means in a plurality of horizontal positions with respect to the vertical axis of said support means;

a pair of vertically-extending track means located in each support means, disposed generally parallel one with respect to the other and spaced apart at a distance which will faciliate bracing of said accessory means in a fixed position, and at a distance for facilitating the structural integrity of said support means;

means defining a channel in each of said track means;

a pair of inwardly-directed flange means, attached to said track means for retaining attachment means within said channel means of each said track means, said respective track means and flange means being substantially parallel one with respect to the other, and said flange means having included therewithin a plurality of vertically-extending, vertically-aligned slot means for securingly maintaining accessory means in a fixed position with respect to said support means;

connector means for adjustably coupling said accessory means to each said track means;

a pair of attachment means which ride within said pair of track means for pivotally coupling said connector means to said track means, each of said attachment means being independently movable in a generally upward and downward direction within the channels of said track means to a plurality of positions along the vertical axis of said track means;

the connector means including means for coupling each of the attachment means to the connector means;

means for allowing a predetermined amount of independent movement between each connector means and each attachment means within a predetermined range so that the connector means can be positioned in a plurality of angular positions with respect to the vertical axis; and said work surface means being attached to said connector means for movement within each of said track means in a generally upward and downward vertical direction, said accessory means being adjustable to a plurality of horizontal positions with respect to the vertical axis of said support means by said movement of said pair of attachment means within said pair of track means.

22. The system of claim 21, wherein said connector means comprises a bracket means interlockingly connected to a retaining bar means disposed for movement in a vertically upward and downward direction within said track means and securingly maintained in a fixed position within vertically aligned slot means.

23. The system 22, wherein said retaining bar means comprises a substantially rectangular elongated bar member having shoulder bar members disposssed at each of its respective opposite ends the locked position, the vertical dimension of said bar means is smaller than its horizontal dimension, the horizontal dimension of said bar member is sized to securingly fit between said respective flanges, and said shoulder member are sized to engage said aligned slots and fit therewithin for securingly maintaining said bar means in a fixed position.

24. The system of claim 1, wherein said connector means for connecting said accessory means to said vertically-extending support means comprises a bracket means interlockingly connected by said pair of attachment means to a pair of retaining bar means disposed for movement in a vertically upward and downward direction within said track means and securingly maintained in a fixed position within a pair of vertically-aligned slot means, each said retaining bar means comprising a substantially rectangular elongated bar member, the vertical dimension of said bar means being smaller than its horizontal dimension, the horizontal dimension of said bar member being sized to securingly fit between said respective flange means, said flange means including aligned slots, and said retaining bar means including shoulder members sized to engage said aligned slots and fit therewithin for securingly maintaining said bar means in a fixed position.

25. A multi-adjustable, multi-functional work station system, which comprises:

a work table;

a pair of vertically-extending support stanchions for maintaining the work table in a plurality of horizontal and angular positions with respect to the vertical axis of the support stanchion;

a pair of vertically-extending tracks located in each support stanchion, disposed generally parallel one with respect to the other, which are spaced apart at a distance which will facilitate bracing of the work table in a fixed position with respect to the support stanchion, and at a distance for facilitating the structural integrity of the support stanchion;

a channel located in each of the tracks;

a pair of attachment means each comprising a bolt and a retaining bar, the bolt being secured to the retaining bar during use;

a pair of vertically-extending flanges attached to the tracks for retaining the retaining bar within the channel of each track, each retaining bar being movable vertically within the channels of the pair of tracks;

a connector comprising a bracket plate joined to a support plate, the bracket plate resting against the face of the support stanchion, and the support plate extending outwardly from the support stanchion, for adjustably coupling the work table to each support stanchion;

a pair of slots located in the bracket plate through which each bolt passes and is secured to the retaining bar for pivotally coupling the connector to the tracks, at least one of the pair of slots being elongated in a direction transversely of the vertical axis so that the connector can be positioned in a plurality of horizontal and angular positions with respect to the vertical axis of the support stanchions; and the work table being attached to the connector and thereby being adjustable to a plurality of horizontal and angular positions with respect to the vertical axis of the support stanchions by movement of the bolt within the elongated slot and by movement of the retaining bars within the pair of tracks.

26. The work station system of claim 25, wherein both slots in each connector are elongated in a direction transversely of the vertical axis and are substantially parallel to each other.

27. The work station system of claim 25, which further comprises a pair of tracks disposed on the opposite sides of each support stanchion thereby forming a dual-sided system wherein the work tables are disposed on both sides of each of the support stanchions.

28. The work station system of claim 27, which further comprises a plurality of side-by-side work station systems wherein each adjacent pair of work tables are coupled to each of the pair of tracks on opposite sides of support stanchion for supporting a pair of work tables on the opposite sides of a single support stanchion.

* * * * *

UNITED STATES PATENT AND TRADEMARK OFFICE
CERTIFICATE OF CORRECTION

PATENT NO. : 4,705,327
DATED : November 10, 1987
INVENTOR(S) : Clifford J. Bollman It is certified that error appears in the above-identified patent and that said Letters Patent is hereby corrected as shown below:

Col 8, line 66 replace "multifunctional" with --multi-functional--.

Col 9, line 20, replace "tothe" with --to the--.

Col 10, line 33, replace "mulit-adjustable, multifunctional" with:

--multi-adjustable, multi-functional--.

Col 10, line 37, after "plurality" insert --of horizontal--.

Col 10, line 66, replace "independant" with --independent--.

Col 12, line 25, after "system" insert --of claim--.

Signed and Sealed this

Nineteenth Day of September, 1989

Attest:

DONALD J. QUIGG

*Attesting Officer*     Commissioner of Patents and Trademarks